United States Patent Office 3,173,895
Patented Mar. 16, 1965

3,173,895
PROCESS FOR PREPARING HARDENABLE CONDENSATION PRODUCTS FROM BIS-TRIAZINONES
Ludwig Orthner, Frankfurt am Main, Karl Horst, Hofheim, Taunus, and Heino Wellens and Hans Le Benich, Bad Soden, Taunus, Germany, assignors to Farbwerke Hoechst Aktiengesellschaft vormals Meister Lucius & Brüning, Frankfurt am Main, Germany, a corporation of Germany
No Drawing. Filed Mar. 27, 1962, Ser. No. 182,939
Claims priority, application Germany, Apr. 1, 1961, F 33,568
9 Claims. (Cl. 260—67.5)

We have found that compounds suitable for the improvement of fibrous materials such as textiles, paper, leather, or similar materials, can be prepared by reacting basic bistriazinones of the formula

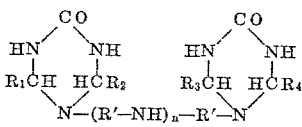

in which $n$ represents the integer 1 or 2, $R_1$, $R_2$, $R_3$, $R_4$ represent hydrogen and/or low molecular alkyl radicals, and $R'$ represents low molecular alkyl radicals, with aliphatic compounds containing a long chain from at least 8 carbon atoms and one functional group capable of reacting with amino groups, and by further reacting in a manner known one mol of the reaction product obtained with 2.0 to 6.0 mols, preferably 3.0 to 5.0 mols, of an aliphatic aldehyde, preferably formaldehyde. If required or desired, the methylol groups may subsequently be etherified with an alcohol according to known methods. To supplement the process, the tertiary amino groups may be quaternized prior to the reaction with aldehydes.

As polyamines which may be used as starting materials for the preparation of the bistriazinones, there enter into consideration, for example, diethylenetriamine, triethylenetetramine, dipropylenetriamine, tripropylenetetramine, bis-N,N'-(γ-aminopropyl)-ethylenediamine.

The polyalkylene polyamines are transformed into bistriazinones in known manner by the reaction with dimethylol urea or with aldehyde and urea. The reaction can be effected at temperatures ranging from 20° C. to 100° C., preferably from 40° C. to 80° C., if required in the presence of suitable diluents, for example, water, alcohols, or the like. The dimethylol urea or the aldehyde and urea are applied in a quantity permitting only two amino groups of the polyalkylene polyamine to be transformed into triazinone groups.

As long chain aliphatic compounds suitable for the further reaction, there enter into consideration those that contain at least 8, preferably 12 to 20, carbon atoms. These compounds, which may also be substituted, may be straight chain, branched or interrupted by aromatic, cycloaliphatic or heterocyclic residues and/or hetero atoms, and they must contain a functional group capable of reaction with the free amino groups of the bistriazinones.

Such reactive groups are, for example, the carboxylic acid halide group, the carboxylic acid azide group and the carboxylic acid ester group, the carbamic acid chloride group, the isocyanate group and chlorocarbonic acid ester group as well as the N-methylolamide group, the N-methylolurethane group and the chloromethyl ether group.

The reaction of these compounds with the bistriazinones can be effected in an aqueous or in an alcoholic solution or in mixtures of these solvents with other appropriate solvents which do not react or which react substantially more slowly than the bistriazinones containing the amino groups with the said functional groups.

The reaction conditions are chosen in accordance with the properties of the long chain compounds or their functional derivatives. Thus, for example, with octadecylisocyanate, the reaction can be effected in an aqueous solution and at 50° C. to 80° C., while for the reaction with lauric acid chloride temperatures will be preferably chosen that are in the range of 0° C. to 40° C. If hydrogen halide liberating substances are used, it is necessary to maintain the medium alkaline by adding a basic compound, for example, a hydrazide, carbonate, bicarbonate or alcoholate of an alkali metal or an alkaline earth metal (depending on the hydrogen halide liberated).

For preparing the alkylol compounds of the substituted bistriazinones, it is preferred to use formaldehyde in the usual commercial solution of 30% to 40% strength. Instead thereof, there may also be used paraformaldehyde in a finely dispersed form. Finally, it is also possible to use other aldehydes, for example, acetaldehyde or glyoxal. Per 1 molecule of bistriazinone, there are used 2 to 6 molecules, preferably 3 to 5 molecules, of aldehyde. The reaction is carried out at a temperature in the range of 20° C. to 100° C., preferably in the range of 40° C. to 80° C., and at pH-values in the range of 6.0 and 10.0, preferably 8 and 9. The reaction requires 1 to 4 hours.

For some application purposes, it is advantageous to etherify the alkylol groups by known methods, for example, by treatment with an excess quantity of alcohol in a strongly acid medium.

In order to improve solubility and stability to salts, it may be of advantage at first to transform, totally or partially, the bistriazinones that have been reacted with the long chain aliphatic compounds into quaternary compounds and then to condense with aldehydes. For quaternization, there may be employed the usual quaternization agents such as halogen alkyls, dialkyl-sulfates, halogencarboxylic acids, and the like. The reaction is effected in a manner as such known, for example, in aqueous solution or suspension at temperatures in the range of 0° C. and 100° C., while maintaining a pH-value of between 6.0 and 10.0.

The products prepared according to the process of the present invention are obtained in the form of solutions in water, alcohol or other solvents or mixtures or in the form of aqueous emulsions or suspensions in the form of a paste. In appropriate dilution, they are suitable for finishing textiles, especially for softening and for producing a flowing pleasant handle of textiles of any kind; the finishes so produced are distinguished by substantially reduced water absorption and remarkable fastness to washing. The products can be used together with the usual commercial crease-proofing and high quality finishing agents.

The products may be applied to the materials by impregnating the material to be treated with an aqueous liquor made up to contain 0.2% to 4.0% of the product of the present invention, and, in addition thereto, a known acid hardening catalyst, for example, magnesium chloride, zinc nitrate, ammonium chloride, diglycolic acid, or the like, and, if required or desired, also other high quality finishing agents, for example, dimethylol-ethylene urea, polymethylol-melamine, and the ethers thereof, then drying the material and fixing it by a condensation process at temperatures in the range of 80° C. and 170° C., preferably 100° C. and 150° C.

In addition to being used with high quality finishing agents, the products of the present invention may be used together with any other textile impregnating agent, for

Example 1

240 g. of dimethylol urea are dissolved in 1300 cc. of water and to this solution are added, with stirring, at room temperature and in the course of ½ hour, 103 g. of diethylenetriamine. After this addition, the whole is stirred for 1 hour at 30° C. and for a further 3 hours at 50° C. Then, 330 g. of octadecylisocyanate are added dropwise in the course of 1 hour and at 50° C. to 60° C. The forming emulsion is stirred for 2 hours at 60° C. After the addition of 440 g. of formaldehyde solution of 30% strength, stirring of the reaction mixture is continued for 1½ hours at 60° C. and at a pH value of 8.3. This pH value is maintained by adding sodium hydroxide solution of 10% strength. Finally, 30 g. of a condensation product of triisobutylphenol and 20 mols of ethylene oxide are added. The product is obtained in the form of a light paste of 30% strength and can be used, after suitable dilution, for the improvement of textiles, for example, for the softening of cotton.

Example 2

400 g. of a formaldehyde solution of 30% strength, 120 g. of urea and 135 g. of dipropylenetriamine are stirred for 2 hours at 25° C. and for 3 hours at 60° C. The solution is cooled to 30° C. and 302 g. of stearic acid chloride are added with intensive stirring, in the course of 1½ hours, while maintaining the pH value at between 8.0 and 8.5 by adding a sodium hydroxide solution of 20% strength. When the addition is terminated, stirring is continued for ½ hour at 50° C. Then 440 g. of a formaldehyde solution of 30% strength are added and the reaction is completed by stirring for 2 hours at 60° C. and at a pH of 8.5 (set by adding sodium hydroxide solution of 10% strength). There is obtained a light paste of 43% strength which solidifies in the cold.

Example 3

120 g. of urea and 310 g. of an aqueous formaldehyde solution of 40% strength are heated for 1 hour to 60° C., at a pH of 8.5; the reaction mixture is cooled to 30° C. and 146 g. of triethylenetetramine are added, with stirring. Stirring is then continued, at first for 2 hours at 30° C. and then for 2 hours at 60° C. 430 g. of lauric acid chloride are then introduced in the course of 2 hours and at 10° C. to 20° C., into the solution thus obtained which has been diluted with water to 1 liter, while maintaining the pH value at between 8.0 and 9.0 by adding sodium hydroxide solution of 20% strength. After having stirred for ½ hour, 440 g. of a formaldehyde solution of 30% strength are added. Stirring is then again continued for 2 hours at 60° C. and at a pH of 8.5. The product is obtained in the form of a solution of 35% strength which is turbid when hot and gelatinous when cold.

Example 4

A bistriazinone solution is prepared from 240 g. of dimethylol urea and 103 g. of diethylenetriamine according to the method described in Example 1. To this solution is added, with intensive stirring, in the course of 2 hours and at 20° C., a mixture of 202 g. of stearic acid chloride and 73 g. of lauric acid chloride. The pH value is kept at between 8.0 and 9.0 by adding a sodium hydroxide solution of 20% strength. After termination of the reaction, 50 g. of dimethylsulfate are added in the course of 40 minutes at 20° C. to 25° C., while keeping the pH value at between 8.0 and 9.0 by adding sodium hydroxide solution. After having stirred for a short period, 130 g. of paraformaldehyde are added and reacted within 3 hours at 60° C. to 70° C. and at a pH of 8.7. The reaction product is obtained in the form of a light paste of 27% strength which is soluble in hot water while yielding a turbid solution.

We claim:

1. A process for preparing hardenable condensation products which comprises reaction bistriazinones, of the formula

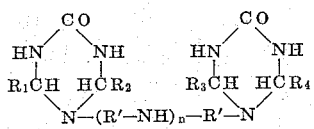

wherein $n$ has an integral value of 1 or 2, $R_1$, $R_2$, $R_3$, and $R_4$ are members selected from the group consisting of hydrogen and lower alkyl radicals and $R'$ is a lower alkyl radical, at a nitrogen atom in the bridge between the triazinone rings with a long-chain aliphatic compound having at least 8 carbon atoms in the chain and one functional group capable of reacting with said nitrogen atom to form a first condensation product, and reacting said first condensation product per mol thereof, with about 2 to 6 mols of a lower aliphatic aldehyde.

2. A process according to claim 1 wherein about 3 to 5 mols of said aldehyde are used.

3. A process according to claim 1 wherein said aldehyde is formaldehyde.

4. A process according to claim 1 wherein, following the reaction of said aldehyde, methylol groups are etherified with a lower aliphatic alcohol.

5. A process according to claim 4 wherein said alcohol is methanol.

6. A process according to claim 1 wherein tertiary amino groups are quaternized prior to reacting said first condensation product with said aldehyde.

7. A process according to claim 1 wherein said functional group of said long-chain aliphatic compound is a member selected from the group consisting of acid halide, acid azide, acid ester, carbamic acid halide, isocyanate, chlorocarbonic acid ester, N-methylolamide, N-methylolurethane and halomethylether groups.

8. A process according to claim 7 wherein said aliphatic compound is a member selected from the group consisting of alkyl isocyanates and alkyl acyl halides.

9. A process according to claim 8 wherein said alkyl isocyanates and alkyl acyl halides contain 12 to 19 carbon atoms.

References Cited in the file of this patent

UNITED STATES PATENTS

| | | |
|---|---|---|
| 2,641,584 | Martone | June 9, 1953 |
| 2,729,617 | Davidson et al. | Jan. 3, 1956 |
| 2,950,553 | Hurwity | Aug. 30, 1960 |
| 3,035,942 | Cooke et al. | May 22, 1962 |

OTHER REFERENCES

Frick et al.: American Dyestuff Reporter, vol. 48, pages 23–25, June 29, 1959.